US006647969B1

United States Patent
Adams

(10) Patent No.: US 6,647,969 B1
(45) Date of Patent: Nov. 18, 2003

(54) VAPOR-SEPARATING FUEL SYSTEM UTILIZING EVAPORATION CHAMBER

(76) Inventor: Joseph S. Adams, 481 Beaver Point Rd., Salt Spring Island, British Columbia (CA)

(*) Notice: Subject to any disclaimer, the term of this patent is extended or adjusted under 35 U.S.C. 154(b) by 0 days.

(21) Appl. No.: 10/021,445

(22) Filed: Oct. 30, 2001

(51) Int. Cl.[7] ............................................. F02B 43/00
(52) U.S. Cl. ..................... 123/527; 123/465 C; 227/10
(58) Field of Search ................. 123/525, 527, 123/557, 465 C; 227/10

(56) References Cited

U.S. PATENT DOCUMENTS

| 3,176,709 A | * | 4/1965 | Jones ........................ 137/340 |
| 4,365,471 A | | 12/1982 | Adams ...................... 60/39.76 |
| 4,717,060 A | | 1/1988 | Cotta ........................ 227/10 |
| 4,721,240 A | | 1/1988 | Cotta ........................ 227/10 |
| 5,213,247 A | | 5/1993 | Gschwend et al. .......... 227/10 |
| 5,526,797 A | * | 6/1996 | Stokes ....................... 123/575 |
| 5,873,508 A | | 2/1999 | MacVicar et al. ............ 227/10 |
| 5,971,245 A | | 10/1999 | Robinson .................... 227/10 |
| 6,006,704 A | | 12/1999 | Phillips et al. ............... 123/46 |
| 6,016,946 A | | 1/2000 | Phillips et al. ............... 227/10 |
| 6,041,603 A | | 3/2000 | Phillips ...................... 60/632 |
| 6,044,825 A | * | 4/2000 | Carter et al. ................. 123/557 |
| 6,045,024 A | | 4/2000 | Phillips ...................... 227/130 |
| 6,123,241 A | | 9/2000 | Walter et al. ................. 227/8 |
| 6,145,495 A | * | 11/2000 | Whitcome ................... 123/525 |

FOREIGN PATENT DOCUMENTS

JP          58-53667 A     *    3/1983

* cited by examiner

*Primary Examiner*—Noah P. Kamen
(74) *Attorney, Agent, or Firm*—Eugene Stephens & Associates; Thomas B. Ryan

(57) ABSTRACT

An evaporation chamber controlled by a pressure drop across an intake valve is used in conjunction with a regulator to supply fuel such as propane in its gaseous state regardless of the chamber's orientation to a portioning fuel injection system for portable engines such as can be used for gas-powered fastening tools.

30 Claims, 5 Drawing Sheets

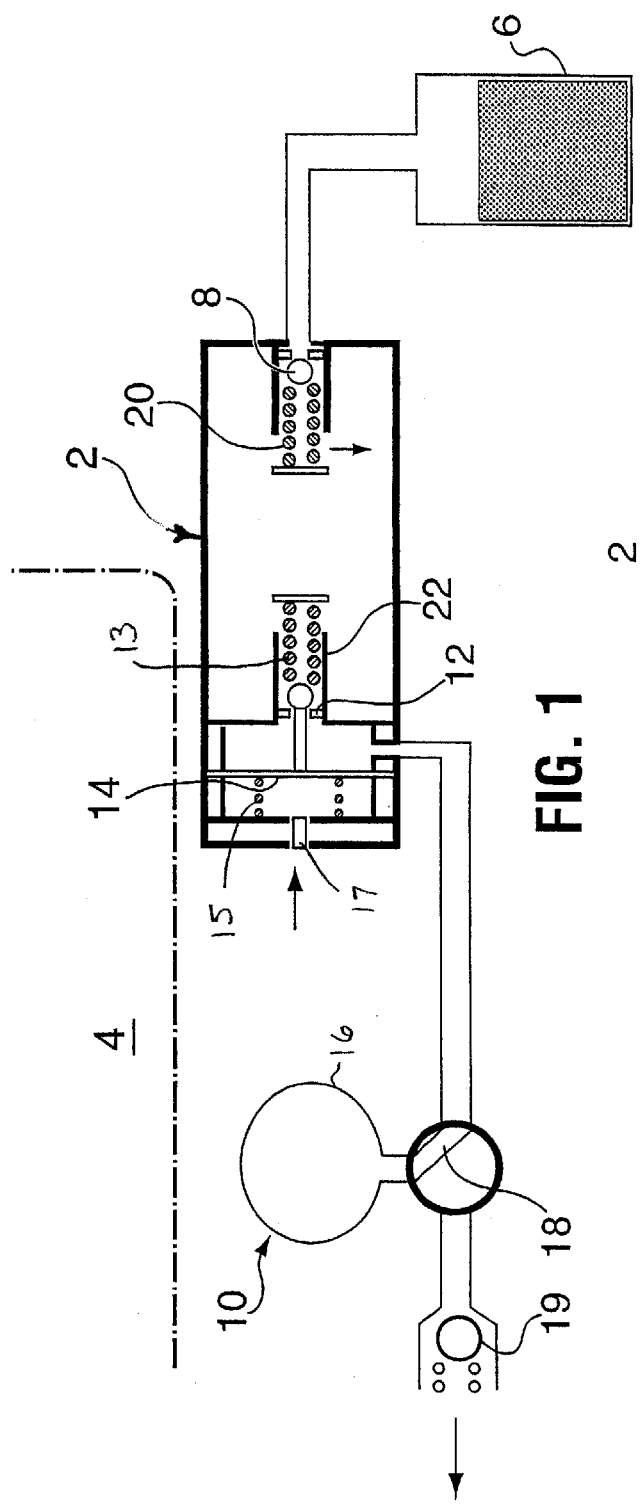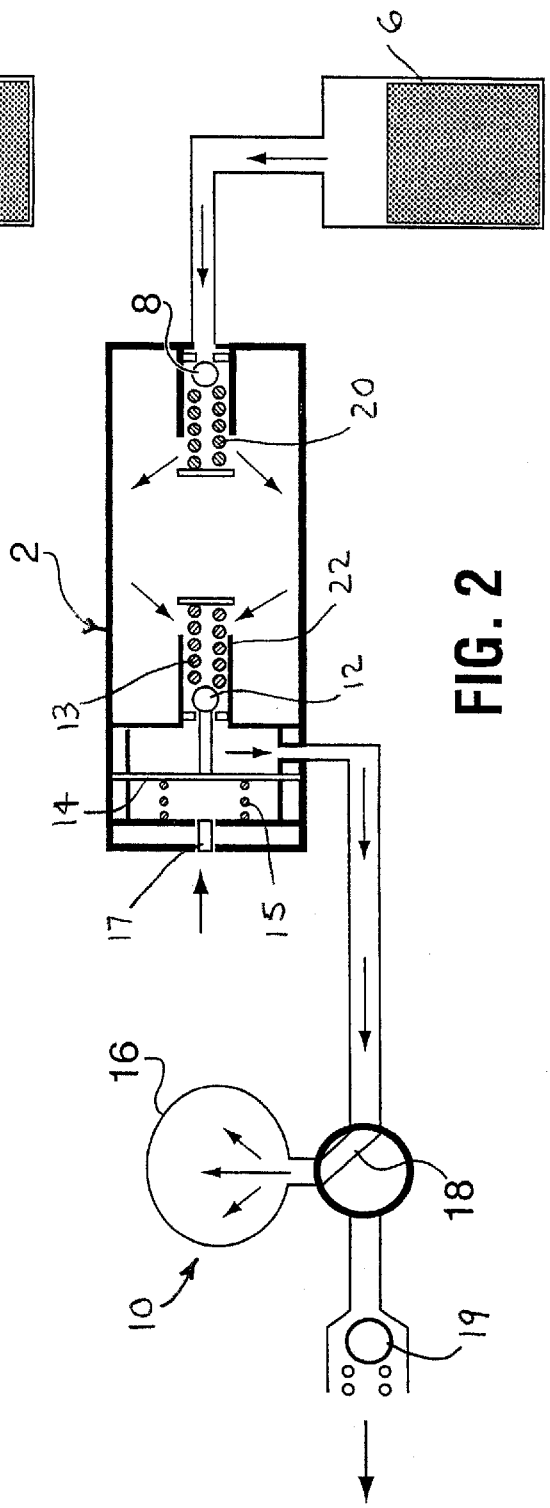

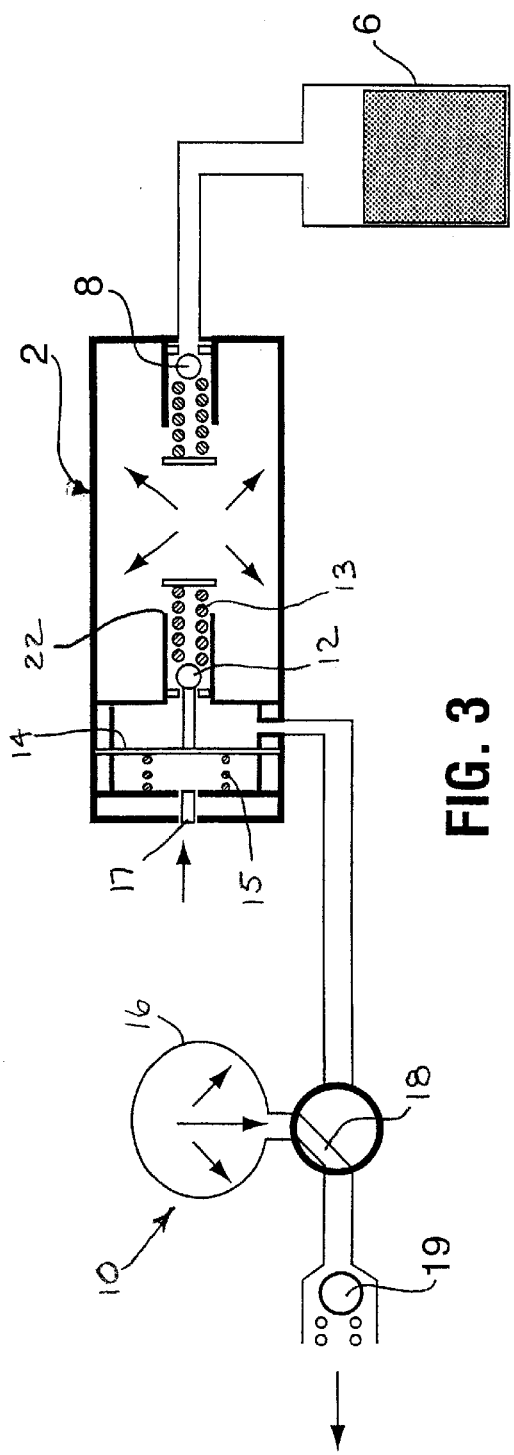
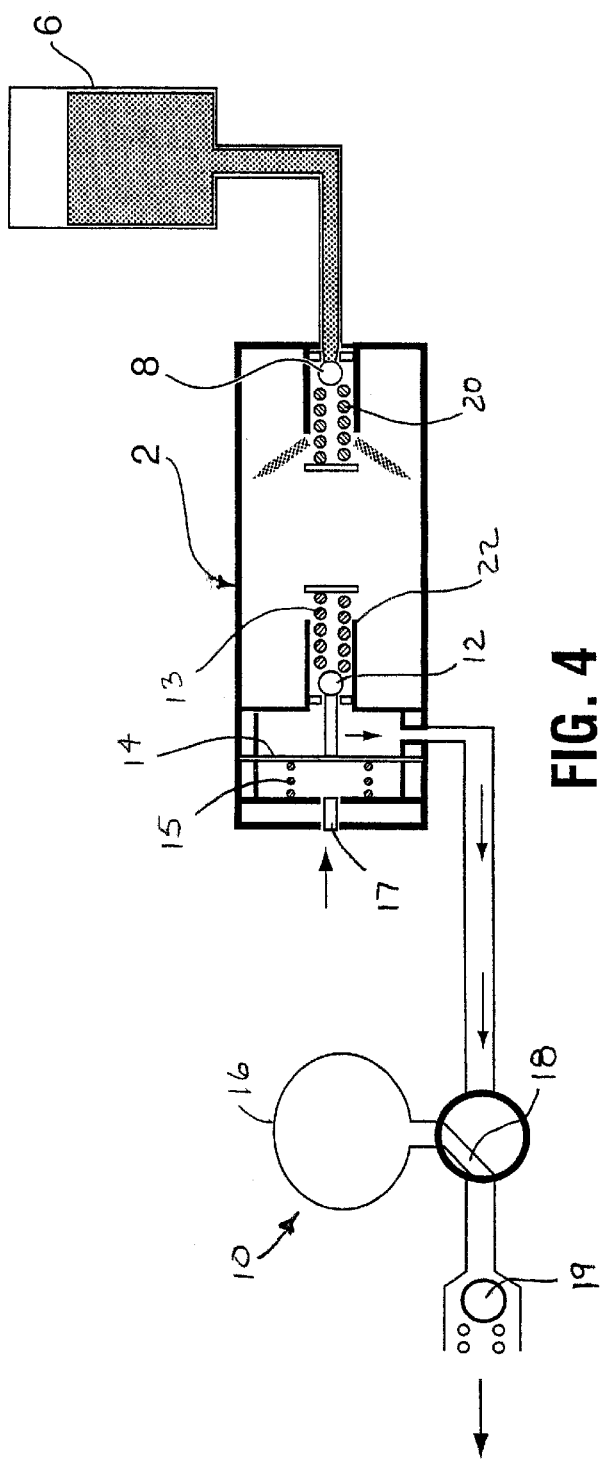

US 6,647,969 B1

VAPOR-SEPARATING FUEL SYSTEM UTILIZING EVAPORATION CHAMBER

TECHNICAL FIELD

The present invention relates to an evaporation chamber for use with portable engines for gas-powered tools such as hand-held fastening or cutting tools.

BACKGROUND

In order to accurately measure and inject small amounts of fuel into a combustion chamber such as can be used in gas-powered fastening tools, it is desirable to convert a liquefied petroleum gas, such as propane or Mapp gas, from a removable container into its vapor state. The fuel can be more easily measured as a gas than as a liquid.

Attempts such as those that appear in U.S. Pat. Nos. 6,016,946 and 6,045,024, which utilize a two-stage regulator, and another that appears in U.S. Pat. No. 5,873,508, which utilizes a single-stage regulator, have poor performance characteristics during periods of high cycling rates or low ambient temperature whereby liquid fuel can get past the regulators. Excess fuel reaching the fuel injector can cause the tool to misfire.

Thus, it is an object of this invention to correct the aforementioned problem under all normal operating conditions. Another object is to provide a durable, inexpensive, and replaceable valving and sealing system in a simple package.

SUMMARY OF THE INVENTION

In accordance with one or more embodiments of the present invention, an evaporation chamber system is provided for use with engines for gas-powered tools to convert liquefied petroleum (LPG) to its vapor state. An exemplary system has an evaporation chamber with an intake check valve at an inlet end to communicate with a source of LPG. The system also has a regulator valve situated at a location remote from the intake check valve through which fuel from the evaporation chamber is passed towards a combustion chamber of the engine. The intake check valve is arranged to deliver a charge of LPG to the evaporation chamber for evaporation into a gaseous state at a lower pressure than that existing at the source of LPG. The regulator valve is arranged to deliver the charge or a portion of it in the gaseous state to the combustion chamber for combustion (for example, by way of a portioning or metering valve).

In a preferred embodiment of the present invention, the regulator valve has an inlet port positioned and extending into a central region of the evaporation chamber so as to permit the inlet port to be located above any liquid level normally found in the evaporation chamber, regardless of the orientation of the evaporation chamber system.

The invention can also be practiced as a method of converting a liquefied fuel to its vapor state for supplying the fuel to a gas-powered engine. The method includes supplying a liquefied fuel from a pressurized source and conveying the liquefied fuel from the pressurized source to an evaporation chamber through a first pressure reducer (e.g., the intake check valve). The liquefied fuel is converted from a liquid state to a gaseous state within the evaporation chamber at a pressure substantially above ambient atmospheric pressure. The gaseous-state fuel from the evaporation chamber is conveyed towards a combustion chamber of the engine through a second pressure reducer (e.g., the regulating valve).

Preferably, the step of conveying the gaseous-state fuel from the evaporation chamber includes conveying the fuel to a portion system at a preset pressure that is less than the pressure in the evaporation chamber and is more than the ambient atmospheric pressure. The gaseous-state fuel is further preferably conveyed from the evaporation chamber through a port located above any liquid fuel levels normally found in the evaporation chamber throughout a range of angular orientations of the evaporation chamber.

Benefits can also be obtained by positioning the evaporation chamber in thermal communication with the gas-powered engine and removably mounting the intake valve within the evaporation chamber.

DRAWINGS

FIG. 1 is a schematic view illustrating a basic configuration of the evaporation chamber system according to the present invention whereby a container of LPG is attached to an evaporation chamber through an intake check valve.

FIG. 2 is a schematic view showing the system of FIG. 1 in operation where a regulated output of fuel from the evaporation chamber is being delivered to a portion valve in a gaseous state.

FIG. 3 is a schematic view showing the portion valve of the system of FIGS. 1 and 2 being activated to close off the regulated output from the evaporation chamber.

FIGS. 4, 5, 6, and 7 are schematic views illustrating the system of FIGS. 1 to 3 in different orientations whereby the fuel is supplied from a source located above the evaporation chamber.

Figure 8:
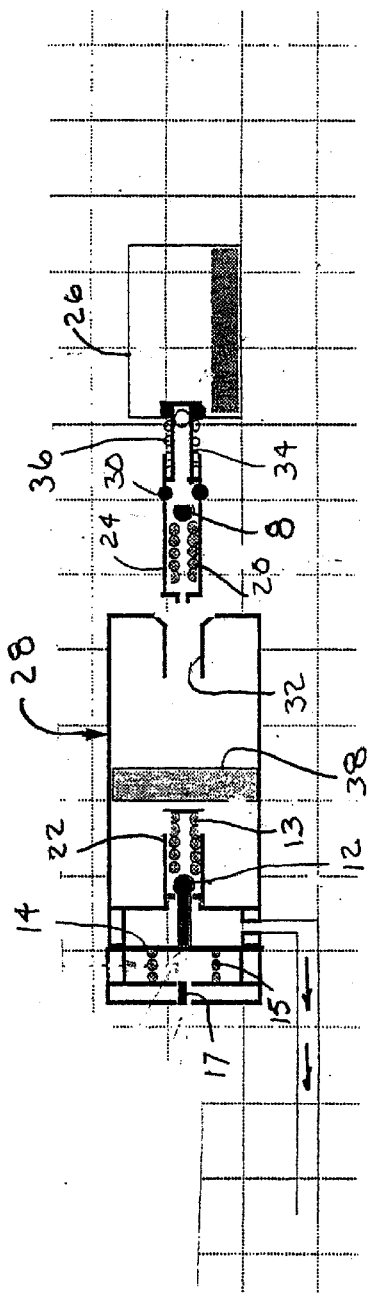
Figure 9:
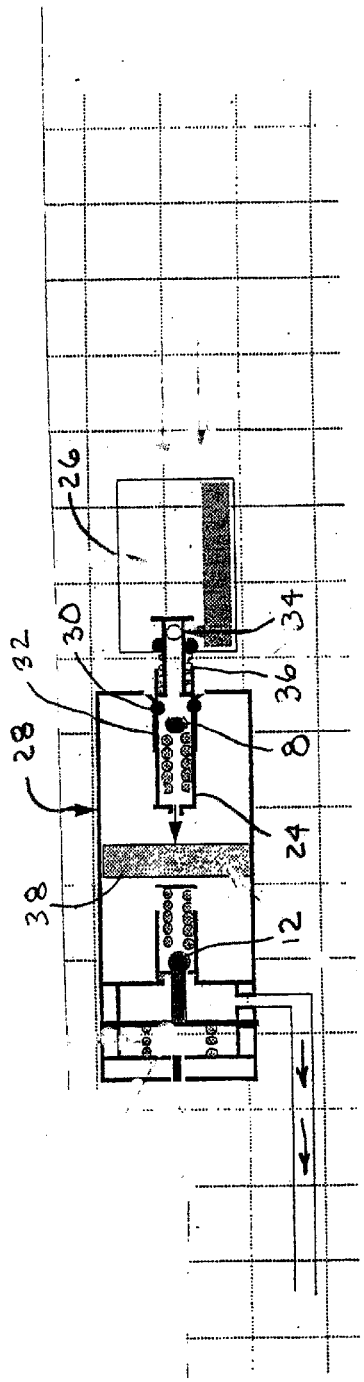

FIGS. 8 and 9 illustrate an alternative embodiment of the present invention whereby an intake check valve is mounted within the valving system of the fuel canister to permit replacement of the fuel canister.

While the invention will be described in conjunction with illustrated embodiments, it will be understood that it is not intended to limit the invention to such embodiments. On the contrary, it is intended to cover all alternatives, modifications, and equivalents as may be included within the spirit and scope of the invention as defined by the appended claims.

DETAILED DESCRIPTION

Turning to FIG. 1, an evaporation chamber 2 is shown for use with an engine 4 for gas-powered fastening tools (not illustrated) to convert liquefied petroleum gas fuel (LPG) into its vapor state. Evaporation chamber 2 is preferably made of heat-conducting material (for instance, a suitable metal) and positioned in thermal communication with an engine 4 so as to facilitate heat transfer from the engine 4 to the evaporation chamber 2 during operation. The evaporation chamber 2 is also arranged in fluid communication with a source 6 of LPG through a pressure-biasing valve, such as an intake check valve 8 at an inlet end of the chamber 2. At a location remote therefrom, the chamber 2 is provided with a regulator valve 12.

A spring 20 biases the intake check valve 8 toward a closed position so that a predetermined pressure differential (e.g., 10 pounds per square inch—psi) between the source 6 and the evaporation chamber 2 is required to allow the LPG fluid to pass through the intake check valve 8 into the evaporation chamber 2 from the LPG source 6. This arrangement provides for a pressure drop from the fuel source 6 (e.g., at 100 psi) to the evaporation chamber 2 (e.g., at 90 psi) across the intake check valve 8. This pressure drop can, of course, be achieved by means other than the intake check valve 8 and the spring 20. For example, any conventional pressure-biasing valve can be used to accomplish this.

A regulator diaphragm 14, together with opposing springs 13 and 15, controls the opening and closing of the regulator valve 12. One side of the diaphragm 14 is exposed to fuel pressure generated by the passage of fuel through the regulator valve 12, and another side of the diaphragm 14 is exposed to atmospheric pressure through a vent 17.

The spring loads of the opposing springs 13 and 15 are set so that the regulator valve 12 remains in open communication with the evaporation chamber 2 until fuel pressure against the diaphragm 14 reaches a predetermined level (e.g., 15 psi). The pressure level of the regulator valve 12 can be made adjustable, for example, by changing spring compression, to adapt the fuel supply to different operating conditions.

Up to the predetermined pressure level, the regulator valve 12 passes vaporized (i.e., gaseous) fuel from the evaporation chamber 2 to a portion system 10, which selectively receives and dumps or otherwise meters a predetermined amount of the gaseous fuel to the engine 4 for combustion. Portion system 10 comprises a portion plenum chamber 16 communicating with the regulator valve 12 through a portion valve 18. When the portion valve 18 is in one operating position, as seen in FIGS. 1, 2, 5, and 6, the portion plenum chamber is filled by a flow of the gaseous fuel from the evaporation chamber 2. When the portion valve 18 is in another operating position, as seen in FIGS. 3 and 4, the contents of the portion plenum chamber 16 are delivered to a fuel injector valve 19 of a fuel injector (not illustrated) for the engine 4.

To enable the evaporation chamber 2 to operate as intended at all attitudes (i.e., through a full range of angular orientations with respect to the force of gravity), the regulator valve 12 has an inlet port 22 that extends into a central region of the evaporation chamber 2. In its central location, the inlet port 22 is maintained above any LPG liquid levels 23 normally found in the evaporation chamber 2 regardless of the orientation of the evaporation chamber 2.

In the embodiment illustrated by FIGS. 8 and 9, the intake check valve 8 is mounted as part of an adapter 24 between a fuel canister 26 and a modified evaporation chamber 28. The adapter 24 can be formed as a permanent attachment to the fuel canister 26 or as a separate coupling mechanism between both the fuel canister 26 and the evaporation chamber 28.

A sealing device, such as an "O" ring 30 mounted on a peripheral surface of the adapter 24, seals the adapter 24 to a mating tubular fitting 32 within the evaporation chamber 28. A valve stem 34 incorporating an aerosol-type valve connects the adapter 24 to the fuel canister 26. A spring 36 biases the valve stem 34 closed.

However, when the adapter 24 is inserted into the evaporation chamber 28, an axial-mounting force overcomes the spring 36 and opens the valve stem 34 to conduct fuel into the evaporation chamber 28 through the intake check valve B. Preferably, the fuel canister 26 is manually retractable from the evaporation chamber 28 enough to cause the valve stem 34 to close, preventing fuel leakage problems when the tool is not in use.

Also within the evaporation chamber 28 is a fuel filter 38 that prevents contaminants in the fuel from reaching beyond the evaporation chamber 28. The fuel filter 38 is located between the intake valve 8 and the regulating valve 12 so that contaminants entering the evaporation chamber 28 through the intake valve 8 are blocked from exiting the evaporation chamber 28 through the regulating valve 12. The fuel filter 38 can be used with any of the previously described embodiments.

In operation, when considering the system arrangement of FIGS. 1–7, the intake check valve 8 is, for example, spring biased so that a predetermined pressure differential across the intake check valve 8 (e.g., 10 psi) is required to allow fluid to pass through the intake check valve 8 into the evaporation chamber 2. The resulting pressure reduction within the evaporation chamber 2 (e.g., from 100 psi to 90 psi) contributes to a vaporization of the fuel within the evaporation chamber 4. At the other end of the evaporation chamber 2, there is regulator valve 12, which allows the vaporized fuel to leave the evaporation chamber 2 at a predetermined further reduced pressure (e.g., 15 psi).

The regulator valve's inlet port 22 extends either by its design, as illustrated, or by an extension tube (not shown) into a central region of the evaporation chamber 2. The inlet port 22 is positioned above the level 23 of any expected amounts of liquid fuel (say 25% by volume) in the evaporation chamber 2 throughout a full range of angular orientation of the evaporation chamber 2. Accordingly, the central position of the regulator valve's inlet port 22 within the evaporation chamber 2 prevents liquid fuel from reaching the engine 4.

The regulated vaporized fuel output from the evaporation chamber 2 goes through the portion system 10, which can be conventionally arranged as disclosed, for example, in U.S. Pat. No. 4,365,471, which is hereby incorporated by reference. The portion valve 18, which can be manually or automatically controlled, can be arranged to selectively fill and dump the plenum chamber 16 to the fuel injector check valve 19 as disclosed in U.S. Pat. No. 4,717,060, which is also hereby incorporated by reference.

The evaporation chamber 2 is preferably made of metal or another heat-conducting material and is preferably mounted next to and in thermal communication with a metal housing of the engine 4. Heat produced during periods of high speed engine operation is transferred to the evaporation chamber 2, thereby benefiting the engine operation by cooling and benefiting the evaporation chamber 2 operation by heating. The evaporating fuel in the evaporation chamber 2 cools the engine 4. The heat from the engine 4 raises the temperature of the evaporation chamber 2, which further enhances evaporation of the fuel within the evaporation chamber 2.

FIG. 2 shows the system in operation where the fuel being delivered to the plenum chamber 16 is in the gaseous state. By way of example, if the fuel in the LPG supply were at 100 psi and the intake check valve 8 had a differential pressure setting of 10 psi, then the pressure in the evaporation chamber 2 would reach 90 psi. Gaseous-state fuel in the evaporation chamber 2 can be delivered through the regulator 12 to the portion valve 18, at say 15 psi. This would pressurize the portion plenum chamber 16 to 15 psi.

FIG. 3 shows the portion valve 18 being activated—closing off the regulated output from the evaporation chamber 2 and dumping the plenum chamber 16 contents into the fuel injector valve 19.

Figure 5:
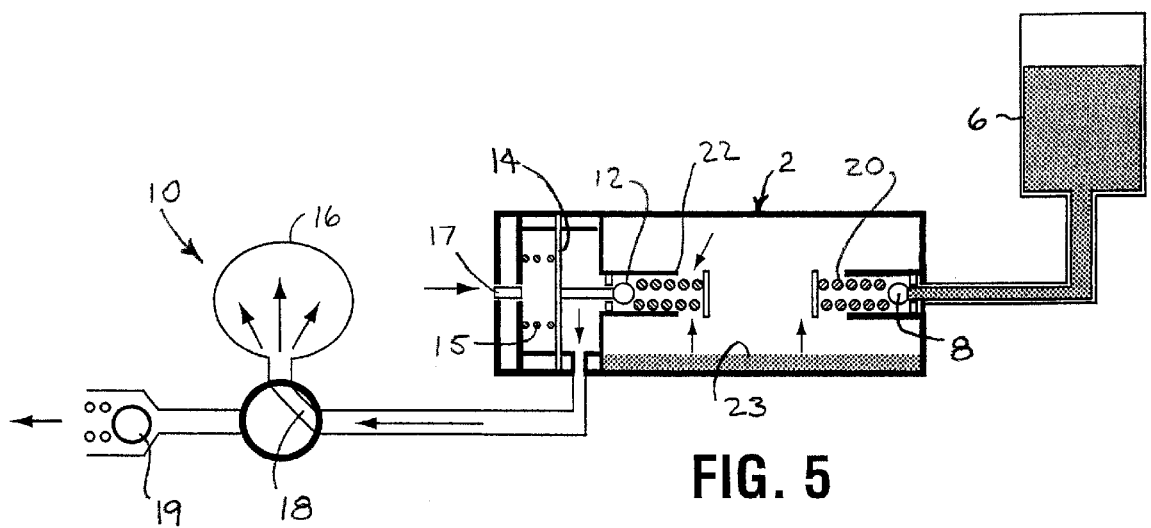
Figure 6:
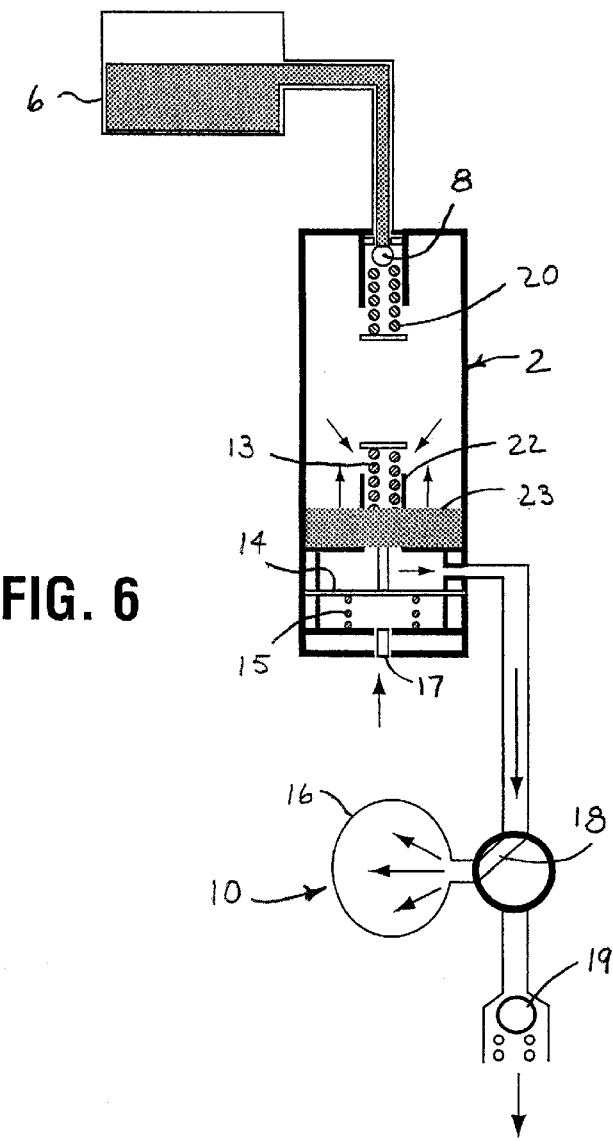
Figure 7:
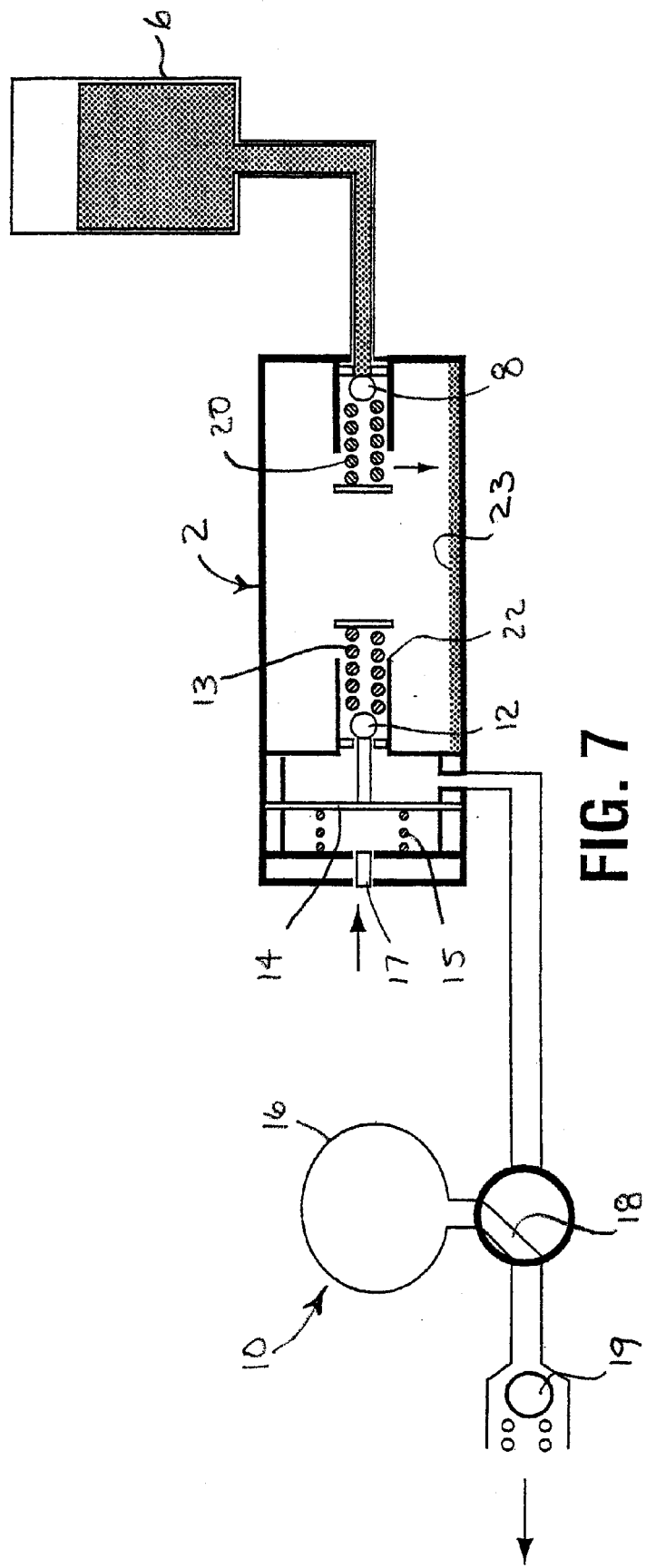

FIGS. 4–6 show what can happen if the system is inverted and some of the LPG entering the evaporation chamber 2 remains in a liquid state. Assuming the fuel is at the same temperature as (or colder than) the evaporation chamber 2 inner surface, small amounts of liquid fuel enter the evaporation chamber 2 through the intake check valve 8 and evaporate upon contact with the inner surface of the chamber 2 until such time as the chamber pressure reached 90 psi and the intake check valve 8 closes. Any remaining liquid in the evaporation chamber 2 would, of course, cause the chamber pressure to go to its equilibrium at that temperature. No further flow would be permitted past the intake check valve 8 (FIG. 5) until enough fuel was used through the injector valve 19 to evaporate all the liquid in the chamber 2 and drop the pressure in the chamber 2 below the established pressure differential of the intake check valve 8.

Thus, it is apparent that there has been provided in accordance with the invention an all-attitude vapor-separating fuel system that fully satisfies the objects, aims, and advantages set forth above. While the invention has been described in conjunction with an illustrated embodiment thereof, it is evident that many alternatives, modifications, and variations will be apparent to those skilled in the art in light of the foregoing description.

I claim:

1. An evaporation chamber system for use with an engine for a gas-powered tool to convert liquefied petroleum gas fuel (LPG) to its vaporous state for delivery to the engine, the system having an evaporation chamber with a pressure-biasing valve at an inlet end to communicate with a source of LPG and a regulator valve situated at a location remote from the pressure-biasing valve through which fuel from the evaporation chamber is passed towards a combustion chamber of the engine, the pressure-biasing valve being arranged to deliver a charge of LPG to the evaporation chamber for evaporation into a gaseous state at a lower pressure than that existing at the source of LPG, and the regulator valve being arranged to deliver at least a portion of the charge in gaseous form towards the combustion chamber at a lower pressure than that existing in the evaporation chamber, wherein the pressure-biasing valve at the inlet end of the evaporation chamber is biased toward a closed position for restricting passage of LPG into the evaporation chamber and is responsive to differential pressure between the source of LPG and the evaporation chamber so that at a predetermined lower pressure in the evaporation chamber than that existing at the source of LPG, the pressure-biasing valve is opened to admit LPG into the evaporation chamber.

2. An evaporation chamber system according to claim 1 wherein the pressure-biasing valve is in the form of an intake check valve that is urged toward an open position by pressure from the source of LPG.

3. An evaporation chamber system according to claim 2 wherein the intake check valve is spring biased toward the closed position.

4. An evaporation chamber system according to claim 1 wherein the regulator valve is controlled by a regulator diaphragm.

5. An evaporation chamber system according to claim 1 wherein the evaporation chamber is made of heat-conducting material and is located adjacent and in thermal contact with the engine housing to facilitate heat transfer of the engine to the evaporation chamber during operation of the engine.

6. An evaporation chamber system for use with an engine for a gas-powered tool to convert liquefied petroleum gas fuel (LPG) to its vaporous state for delivery to the engine, the system having an evaporation chamber with a pressure-biasing valve at an inlet end to communicate with a source of LPG and a regulator valve situated at a location remote from the pressure-biasing valve through which fuel from the evaporation chamber is passed towards a combustion chamber of the engine, the pressure-biasing valve being arranged to deliver a charge of LPG to the evaporation chamber for evaporation into a gaseous state at a lower pressure than that existing at the source of LPG, and the regulator valve being arranged to deliver at least a portion of the charge in gaseous form towards the combustion chamber at a lower pressure than that existing in the evaporation chamber, wherein the regulator valve has an inlet port positioned and extending into a central region of the evaporation chamber system above any liquid levels normally found in the evaporation chamber, regardless of the orientation of the evaporation chamber system.

7. An evaporation chamber system according to claim 6 wherein the regulator valve inlet port is located in a side of the evaporation chamber opposite from the pressure-biasing valve.

8. An evaporation chamber system for use with an engine for a gas-powered tool to convert liquefied petroleum gas fuel (LPG) to its vaporous state for delivery to the engine, the system having an evaporation chamber with a pressure-biasing valve at an inlet end to communicate with a source of LPG and a regulator valve situated at a location remote from the pressure-biasing valve through which fuel from the evaporation chamber is passed towards a combustion chamber of the engine, the pressure-biasing valve being arranged to deliver a charge of. LPG to the evaporation chamber for evaporation into a gaseous state at a lower pressure than that existing at the source of LPG, and the regulator valve being arranged to deliver at least a portion of the charge in gaseous form towards the combustion chamber at a lower pressure than that existing in the evaporation chamber, wherein the pressure-biasing valve is in the form of an intake check valve, and wherein the intake check valve is associated with a fuel canister which is removably mounted on the evaporation chamber to permit replacement of the canister when empty.

9. An evaporation chamber system according to claim 8 wherein the fuel canister is further provided with sealing means to seal the canister against leakage of fuel from the evaporation chamber when the canister is mounted on the evaporation chamber.

10. An evaporation chamber system for use with an engine for a gas-powered tool to convert liquefied petroleum gas fuel (LPG) to its vaporous state for delivery to the engine, the system having an evaporation chamber with a pressure-biasing valve at an inlet end to communicate with a source of LPG and a regulator valve situated at a location remote from the pressure-biasing valve through which fuel from the evaporation chamber is passed towards a combustion chamber of the engine, the pressure-biasing valve being arranged to deliver a charge of LPG to the evaporation chamber for evaporation into a gaseous state at a lower pressure than that existing at the source of LPG, the regulator valve being arranged to deliver at least a portion of the charge in gaseous form towards the combustion chamber at a lower pressure than that existing in the evaporation chamber, the evaporation chamber system and a portion system being arranged to receive gaseous fuel from the regulator valve and selectively receive and dump or otherwise meter a predetermined amount of that fuel to a fuel injector check valve for delivery to the engine for combustion.

11. An evaporation chamber system according to claim 10 wherein the portion system comprises a portion plenum chamber communicating with the regulator valve through a portion valve, the portion valve being actuable to close off the regulated output from the evaporation chamber system and simultaneously dump the portion plenum chamber contents to the fuel injector.

12. An evaporation chamber system for use with a gas-powered engine to convert a liquefied fuel to its vapor state comprising:
   an evaporation chamber that converts the liquefied fuel from a liquid state to a gaseous state at a pressure substantially above ambient atmospheric pressure;
   an inlet that connects the evaporation chamber to a pressurized supply of the liquefied fuel through an intake valve for reducing pressure of the liquefied fuel entering the evaporation chamber; and
   a regulator valve that outputs the fuel from the evaporation chamber in a gaseous state at a further reduced pressure for supplying the gas-powered engine with fuel,
   wherein the intake valve is biased toward a closed position for restricting passage of liquefied fuel into the evaporation chamber and is responsive to differential pressure between the pressurized supply of liquefied fuel and the evaporation chamber so that at a predetermined lower pressure in the evaporation chamber than that existing at the pressurized supply of liquefied fuel, the intake valve is opened to admit liquefied fuel into the evaporation chamber.

13. As The evaporation chamber system of claim 12 in which the regulator valve supplies the gaseous-state fuel to a portioning system that dispenses predetermined amounts of the gaseous-state fuel to the engine.

14. The evaporation chamber system of claim 13 in which the regulator valve supplies the portioning system with gaseous fuel at a preset pressure that is less than a pressure in the evaporation chamber and is more than the ambient atmospheric pressure.

15. The evaporation chamber system of claim 12 in which the intake valve is located within the evaporation chamber inlet to support a preset pressure drop between the supply of liquefied fuel and the evaporation chamber.

16. The evaporation chamber system of claim 12 in which the intake valve is removably mounted within the evaporation chamber inlet.

17. The evaporation chamber system of claim 12 in with the evaporation chamber is positioned in thermal contact with the engine.

18. An evaporation chamber system for use with a gas-powered engine to convert a liquefied fuel to its vapor state comprising:
   an evaporation chamber that converts the liquefied fuel from a liquid state to a gaseous state at a pressure substantially above ambient atmospheric pressure;
   an inlet that connects the chamber to a pressurized supply of the liquefied fuel through an intake valve for reducing pressure of the liquefied fuel entering the evaporation chamber;
   a regulator valve that outputs the fuel from the evaporation chamber in a gaseous state at a further reduced pressure for supplying the gas-powered engine with fuel,
   wherein the regulator valve has an inlet port that extends within the evaporation chamber to prevent the fuel in a liquid state from entering the regulator valve; and
   the inlet port of the regulator valve being at least partially centered within the evaporation chamber so that the inlet port is located above any liquid fuel levels normally found in the evaporation chamber, regardless of the orientation of the evaporation chamber.

19. An evaporation chamber system for use with a gas-powered engine to convert a liquefied fuel to its vapor state comprising:
   an evaporation chamber that converts the liquefied fuel from a liquid state to a gaseous state at a pressure substantially above ambient atmospheric pressure;
   an inlet that connects the evaporation chamber to a pressurized supply of the liquefied fuel through an intake valve for reducing pressure of the liquefied fuel entering the evaporation chamber; and
   a regulator valve that outputs the fuel from the evaporation chamber in a gaseous state at a further reduced pressure for supplying the gas-powered engine with fuel,
   the intake valve being removably mounted within the evaporation chamber inlet,
   wherein the intake valve includes an adapter body and the evaporation chamber inlet includes a fitting for receiving the adapter body of the intake valve.

20. The evaporation chamber system of claim 19 in which the adapter body of the intake valve is mounted on or within a fuel canister that provides the pressurized supply of the liquefied fuel.

21. The evaporation chamber system of claim 20 in which the fuel canister includes a valve stem for connecting the supply of liquefied fuel to the intake valve.

22. The evaporation chamber system of claim 21 in which the valve stem provides for opening and closing a passage for supplying liquefied fuel to the intake valve.

23. A method of converting a liquefied fuel into its vapor state for a gas-powered engine comprising steps of:
   supplying a liquefied fuel from a pressurized source;
   conveying the liquefied fuel from the pressurized source to an evaporation chamber through a first pressure reducer;
   converting the liquefied fuel from a liquid state to a gaseous state within the evaporation chamber at a pressure substantially above ambient atmospheric pressure; and
   conveying the gaseous-state fuel from the evaporation chamber towards a combustion chamber of the engine through a second pressure reducer,
   wherein the step of conveying the liquefied fuel from the pressurized source to the evaporation chamber through the first pressure reducer includes (a) biasing the first pressure reducer toward a closed position for restricting passage of liquefied fuel into the evaporation chamber and (b) overcoming the biasing of the first pressure reducer with a differential pressure between the pressurized source and the evaporation chamber so that at a predetermined lower pressure in the evaporation chamber than that existing at the pressurized source, the first pressure reducer is opened to admit liquefied fuel into the evaporation chamber.

24. The method of claim 23 in which the step of conveying the liquefied fuel from the pressurized source includes passing the liquefied fuel through a pressure-reducing valve.

25. The method of claim 24 including the further step of locating the pressure-reducing valve within an inlet of the evaporation chamber to support a preset pressure drop between the supply of liquefied fuel and the evaporation chamber.

26. The method of claim 25 including a further step of removably mounting the pressure-reducing valve within the inlet of the evaporation chamber for connecting and disconnecting the evaporation chamber to the pressurized source.

27. The method of claim 23 including a further step of positioning the evaporation chamber in thermal contact with the gas-powered engine.

28. The method of claim 23 in which the step of conveying the gaseous-state fuel includes conveying the fuel from the evaporation chamber to a portion system for dispensing predetermined amounts of the gaseous-state fuel to the combustion chamber.

29. The method of claim 28 in which the step of conveying the gaseous-state fuel from the evaporation chamber includes conveying the fuel to the portion system at a preset pressure that is less than the pressure in the evaporation chamber and is more than the ambient atmospheric pressure.

30. A method of converting a liquefied fuel into its vapor state for a gas-powered engine comprising steps of:

supplying a liquefied fuel from a pressurized source;

conveying the liquefied fuel from the pressurized source to an evaporation chamber through a first pressure reducer;

converting the liquefied fuel from a liquid state to a gaseous state within the evaporation chamber at a pressure substantially above ambient atmospheric pressure;

conveying the gaseous-state fuel from the evaporation chamber towards a combustion chamber of the engine through a second pressure reducer, wherein the step of conveying the gaseous-state fuel from the evaporation chamber includes directing the gaseous-state fuel though a port positioned within the evaporation chamber to prevent the fuel in a liquid state from reaching the combustion chamber; and the port being at least partially centered within the evaporation chamber so that the port is located above any liquid fuel levels normally found in the evaporation chamber, regardless of the orientation of the evaporation chamber.

* * * * *

UNITED STATES PATENT AND TRADEMARK OFFICE
CERTIFICATE OF CORRECTION

PATENT NO. : 6,647,969 B1
DATED : November 18, 2003
INVENTOR(S) : Joseph S. Adams It is certified that error appears in the above-identified patent and that said Letters Patent is hereby corrected as shown below:

<u>Title page,</u>
Item [74], "*Attorney, Agent or Firm* - Eugene Stephens & Associates; Thomas B, Ryan" should read -- *Attorney, Agent or Firm* - Harter, Secrest & Emery, LLP; Thomas B. Ryan --

Signed and Sealed this

Seventeenth Day of February, 2004

JON W. DUDAS
*Acting Director of the United States Patent and Trademark Office*